May 30, 1967 D. SILVERMAN 3,322,030

METHOD AND APPARATUS FOR SEARCHING AN INVERTED FILE INFORMATION SYSTEM

Filed Jan. 22, 1965 3 Sheets-Sheet 1

INVENTOR.

Daniel Silverman

INVENTOR.
Daniel Silverman

INVENTOR.
Daniel Silverman 3,322,030

METHOD AND APPARATUS FOR SEARCHING AN INVERTED FILE INFORMATION SYSTEM

Daniel Silverman, 5969 S. Birmingham, Tulsa, Okla. 74105

Filed Jan. 22, 1965, Ser. No. 427,427
49 Claims. (Cl. 88—24)

This invention is a continuation-in-part of my copending application S.N. 158,000, entitled "Method and Apparatus for Storing on and Retrieving Information From Multiple Information Strips," filed Dec. 8, 1961, now U.S. Patent No. 3,179,001.

This invention is directed to the application of optical techniques, including microfilm techniques, to the storage and retrieval of information. More particularly, it is concerned with the search and retrieval of items of information, or documents, on the basis of terms, uniterms, descriptors or other "properties" which are, or may be, used to describe the information content of an item of information.

In the art of information search and retrieval, there are two important parts, the first might be called the "search" part. It is that part of the system that accepts as input, the terms, uniterms, descriptors or other "properties" that describe an item of information, and produces as output, the address of items of information, each of which can be described in terms of the descriptors used in the search. The second part of the information system might be called the "retrieval" part. It stores abstracts or facsimiles of the information in accordance with predetermined addresses, and produces them on demand, when the address is given. It is the first part of the overall information system, the search part, with which this invention is concerned.

There are two principal ways in which a "search" information system can be organized. The first way, the so-called "direct file" system, is to prepare a card for each information item (or identifying index symbol for that item or unit of information) and on this card to list all of the terms or descriptors that are associated with that item. To search the file for information having a given pattern of descriptors it is necessary to scan the entire information file. This is a slow laborious procedure, which requires the search of the entire file. While this procedure is well adapted to computer operation, it is lengthy and inefficient. This type of system is called the "direct file" system because it is entered *directly* in accordance with the symbol of the item of *information.*

There is another, faster "search" system, known as the "inverted file" system. In this system, cards are prepared, one for each descriptor or property of the information items. On each card is listed the symbols of all items of information having that particular descriptor or property. Each card is prepared for a different descriptor. For small files, all that need be done is to pull from the file the cards for each of the several descriptors to be searched, and then to compare the cards, looking for the symbols of information items that appear on all cards. This is rather difficult to do by visual inspection. However, by punching holes in the cards, the location of which are the symbols for, and identify, the items of information, the cards can then be superimposed and those locations which are punched in all cards can be identified immediately. These are the so-called "peek-a-boo" cards. The Termatrex cards, manufactured by Jonker Business Machines, Inc., Gaithersburg, Md., are an example of one commercial system based on the inverted file.

While the "direct file" system has been adapted to computer search, the "inverted file" has so far been limited to manual operation, such as by the use of the Termatrex cards. The user selects those punched cards for the particular descriptors in which he is interested, places them in coincidence in front of a light source and looks for spots of light. Those spots of light which show through the stock of cards identify the addresses of the information items which have all of the descriptors corresponding to the cards selected.

In my patents U.S. No. 2,820,907 and No. 3,158,846, and in my copending application S.N. 158,000, now U.S. Patent No. 3,179,001, I show ways in which closely spaced tracks of digital information, displaying patterns of spots, can be prepared on microfilm, and can be displayed on and aligned with a corresponding scanning system to read and recognize said patterns of spots. The means disclosed for aligning the patterns of spots in rows and columns to a scanning system, permit the use of matrices of spots having up to 100,000 to 500,000 spots or more, as desired. This capability now makes it possible to utilize an inverted file system and to prepare microfilm facsimilies of the punched cards, and have them machine readable. Of course, this will require the use of reference indicia photographed with the matrices of spots, and appropriate optical servo systems, as in U.S. No. 2,820,907, or a reference track and correspondig detection, control and switching elements as in U.S. No. 3,158,846, and means such as disclosed in S.N. 158,000, now U.S. Patent No. 3,179,001, for successively presenting such fascimilies to a scanning device.

There may be as many as 1000 or more descriptors in the Thesaurus used to describe all of the information in the file. Each descriptor has a separate card. Each of these 1000 cards may carry 100,000 to 500,000 spots, each spot corresponding to an item of information in the file. Thus, in order to avoid having to scan and read each of these spots, (up to 500,000,000), I propose to index this "information" with a simpler digital index, one for each pattern of spots, that is, for each descriptor, that can be searched rapidly. I also propose to divide the length of the film strip into "sections" to minimize the length of strip to be searched for the index, all of which is fully described in S.N. 158,000, now U.S. Patent No. 3,179,001.

Thus, given the index of one of the descriptor cards desired, I propose to search the film for the desired descriptor index, and then to present the corresponding pattern of spots, corresponding to the items of information having that descriptor, to a suitable scanner, as will be described below. This scanner will read this pattern and store it. Then I will choose the pattern corresponding to a second descriptor. I will then present this second pattern to the scanner which will make a comparison between the two patterns (the stored pattern and the new one) and indicate and/or record the result of the comparison. This pattern resulting from the first comparison can then be compared with the pattern corresponding to a third descriptor, and so on.

The microfilm patterns of all of the descriptors can be assembled on a strip film as in S.N. 158,000, now U.S. Patent No. 3,179,001, or they can be assembled on a sheet or card (the so-called "microfiche") in a rectangular array of rows and columns.

It is a primary object of this invention to provide a rapid automatic system, using the inverted file, to search for the addresses of items of information corresponding to a plurality of specified descriptors. It is a further object to provide a system which can search for information in accordance with any desired number of descriptors. It is a further object to produce a display showing the addresses of all items of information having the desired descriptors. It is another object of this invention to provide a rapid automatic system for reading and recording in machine readable form the pattern of spots in a microfilm type record of a spot pattern. Another object is to provide a system of handling microfilm facsimilies of spots patterns having great numbers of possible spot positions in the matrix. Another object is to provide instrument means for optically comparing two or more spot patterns having the same matrix.

These and other important objectives, advantages, and features of this invention will become apparent from the following detailed description taken in conjunction with the accompanying drawings, in which.

Figure 1:
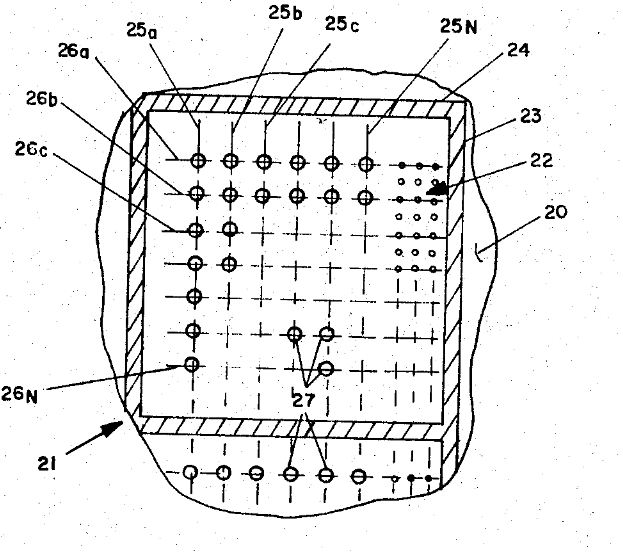
FIGURE 1 shows a portion of a spot pattern on a record medium suitable for use in this search system.

In FIGURE 1, I show one type of information record adapted for use in this information system. It comprises a record sheet, card or strip 20 of paper, metal, or plastic, or the like. Normally, this would be an opaque sheet with translucent spots or areas, although spots of other character, such as reflecting spots, may be used. This can be prepared by using a sheet or strip of photographic film, and exposing appropriate areas and developing and reversing, or by perforating an opaque card, or by locally burning off a thin metallic or other opaque coating on a sheet of transparent paper or plastic, and so on, as is well known in the art. The scale and size of the card or record can be anything desired, that is, it can be full scale, of the size and spot spacing of, say an IBM tabulating card. It can also be a microfilm, with the scale reduced by a factor of 50 or 100 or more, to provide a spot density of the order of 250,000 to one million spots per square inch.

On this sheet or card is an area 21 devoted to information spots 27 arranged in a rectangular matrix of columns 25*a*, 25*b*, 25*c*–25*n*, etc., and rows 26*a*, 26*b*, 26*c*–26*n*, etc.

In another area is a pattern of index spots 22 which by their pattern identify the particular information pattern 21. Also, it is desirable to provide on the record sheet, transvere and longitudinal guide indicia 23, 24, respectively, by which, in conjunction with appropriate servo means, this pattern of information spots can be placed in proper register with other cooperating apparatus as will be described later. The guide indicia are preferably printed or created on the record at the same time and in the same manner as the pattern of information spots 21, as is fully described in my U.S. Patent #2,820,907.

Of course, any material or method of manufacture of the record card is possible, and any desired arrangement of pattern 21, index 22, and indicia 23 and 24, can be used. The record can be a large sheet on which a multiplicity of assemblies, or cards, each including 21, 22, 23, and 24, are carried. These assemblies or cards can be arranged in some suitable relation, such as rectangular grid, for easy location, etc. Or it can be a long strip or tape on which these assemblies or cards are arranged in one or more columns. For convenience in discussing the details of the various embodiments to be described later, I shall refer to the assembly, or the record of FIGURE 1 as a "card" or "record" or "record card," even though the record medium may include a multiplicity of such individual cards, etc. When I talk of inserting a new card, I refer to shifting the sheet or strip so that a different pattern 21 is centered before the scanner, etc.

Preferably, the record is a photographic film, either sheet or strip, with the pattern 21 in optically reduced form, so that the numbers of spots 27 (of the order of tens or hundreds of thousands) may be recorded in small space. It will be clear that while the matrix 25, 26 may have this many possible spot positions, each record card may have only a small fraction of this total actually present in the form of translucent spots or areas. In the information retrieval process, each of the points in the matrix represents a unit for information, or document, in a collection, while the translucent spots represent those units of information in the collection which have the particular descriptor represented by that card.

Figure 2:
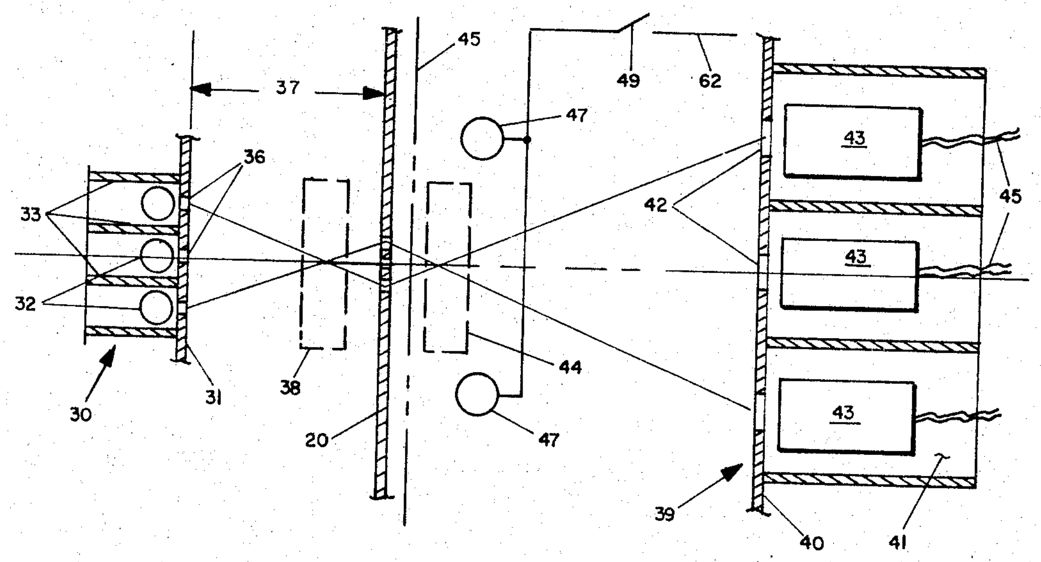
FIGURE 2 is a schematic drawing of an electro-optical system for reading spot patterns on a record, and for making comparisons between a luminous spot pattern and a recorded spot pattern.
Figure 3:
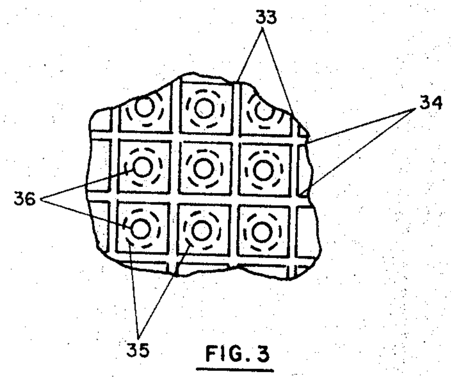
FIGURE 3 is a view of a portion of the light source used in FIGURE 2.

In FIGURE 2, I show in plan view a cross section of an assembly of apparatus including the strip or card 20. There is a luminous assembly 30, which comprises a housing 31, with baffles 33, 34, forming a matrix of rectangular compartments 35 (FIG. 3). In each of these compartments is a luminous source, such as a filament or gaseous conducting lamp 32. In the housing 31 are openings 36 centered on each compartment, through which light from the lamps 32 can project. By lighting preselected lamps 32 by means well known in the art, a pattern of luminous areas 36 can be formed.

Optical means 38 are provided for projecting an image of the luminous pattern of 30 onto the card 20. There is provided, but not shown, means for positioning the record card 20 in a plane parallel to and spaced a fixed distance 37 from the face 31 of the luminous assembly 30, in such a manner that the matrix of 30 coincides exactly with the matrix of 21. The guide indicia 23, 24, and servos (not shown) are used to provide the coincidence of the two matrices. This type of photoelectric servo is described in U.S. #2,820,907.

It will be clear that if the two matrices are precisely superimposed, there may be luminous spots in 30 which coincide in position with the translucent spots in 20. If so, light will shine through the card at these positions. Thus, a first pattern of luminous spots in 30, when compared in this manner with a second pattern of translucent spots in card 20, will provide a third pattern of luminous spots (composed of those beams of light passing through the spots in 20) which comprises those positions of the matrix which are common to the said first and second patterns.

In FIGURE 2, I show a detector assembly 39 composed of a structure 40 very similar to 31, with compartments 41 arranged in the matrix form, with openings 42 in the front, exposing light sensitive detectors or sensors 43 placed in each of the compartments. The pattern of lighted spots on the back surface of 20 is projected by optical means 44 onto the detector assembly 39, such that the luminous spots will project through the openings 42 to the detectors 43. These detectors can be photoelectric cells, photosensitive devices of the solid state variety, or other photoelectric sensors which can receive light on their face and create a change in electrical circuit conditions to correspond.

Assemblies 30 and 39 and optics 38 and 44 are fixed in position with respect to each other such that when the card 20 is in its proper position the 3 matrices of 30, 20, and 39, will be in alignment and spots in corresponding position in the matrices 30 and 20 will provide a corresponding indication in the same position 25, 26, and 40, and an appropriate output signal via leads 45 will be produced.

It is possible to insert a sheet of photosensitive material in the plane 45 adjacent the card 20, or elsewhere in the optical system, which can be used to make a permanent record of the third pattern of spots. However, I prefer (possibly, in addition) to make a temporary record of the third pattern, which can later be used to control the pattern of 30 to make the pattern of luminous spots the same as the third pattern recorded by 39. Then, if a second card 20 with a fourth pattern of luminous spots is placed in position, a fifth pattern of spots will be produced which will constitute those spots in the matrix which are common to the first, second, and fourth patterns. By this means it is possible to successively make comparisons between any desired numbers of patterns.

Figure 4:
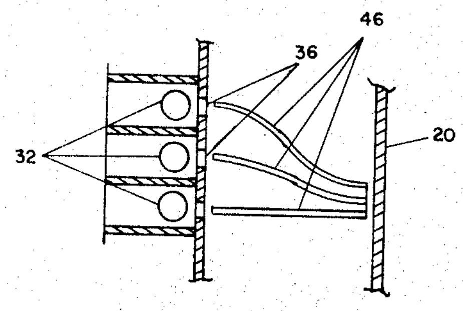
FIGURE 4 is a view of another embodiment of a means to project the luminous pattern onto the record pattern.

Before leaving FIGURE 2, I wish to point out that while I have shown an optical system 38 for projecting the luminous pattern of 30 onto the card 20, there are other well known ways of projecting the pattern of spots of 30. One such way is shown in FIGURE 4. This makes use of glass fibers (or plastic rods) 46 to carry the light from the widely spaced openings 34 to the closely spaced translucent spots in 20. The use of glass fibers for changing geometry in this way is well known in the art.

Figure 5:
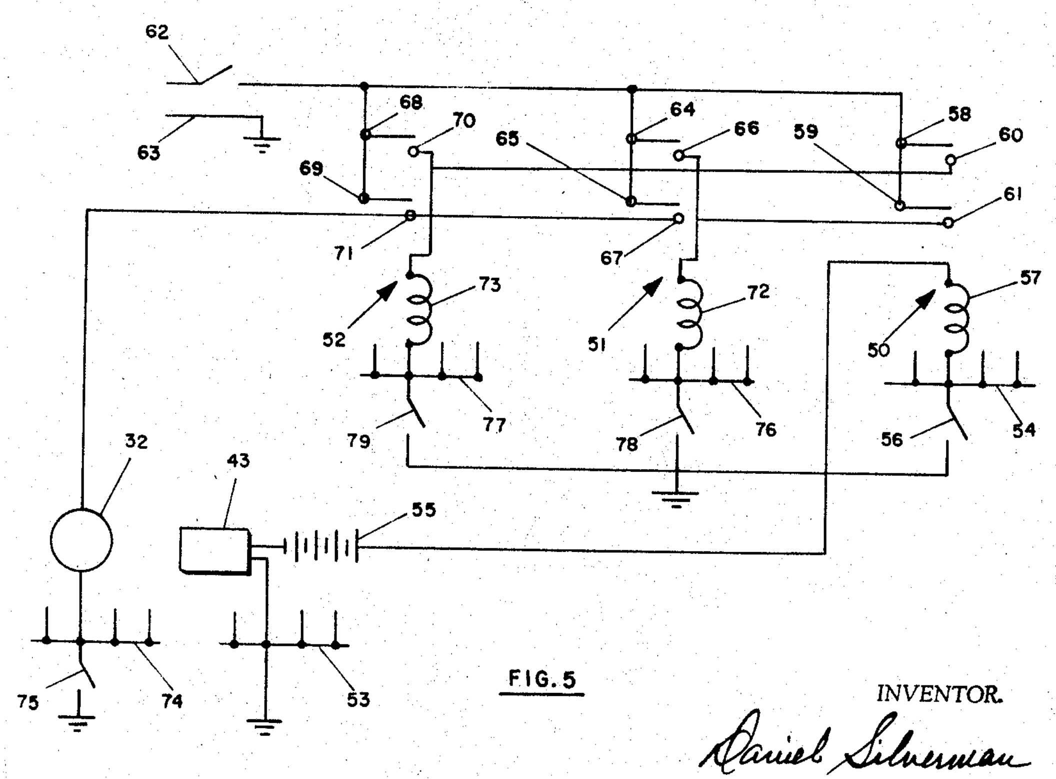
FIGURE 5 is an embodiment of a possible circuit for detecting the comparison pattern of spots and for controlling the luminous pattern of spots to take this same pattern.

I refer now to FIGURE 5 in which the lamp 32 and sensor or detector 43 are in corresponding positions in the matrix. Associated with the sensor 43 are 3 relays 50, 51, and 52. These are for the purpose of making a temporary reproducible record of the light pattern falling on the sensors 43, and controlling the lamps 32 to reproduce this light pattern falling on the sensors.

Consider that the sensor 43 is photoresistive, that is, when light falls on it, its resistance drops from a large value to a small value. There are available on the market small zinc sulphide photoresistors that are as small as ¼-inch diameter, which have a dark resistance of megohms, and a resistance when illuminated as low as 50 ohms. We can connect a battery 55 in series with the sensor 43, relay coil 57, and switch 56. When 56 is closed, and no light falls on 43, the resistance in series with the coil 57 is too high and the relay will not pull in. When the light falls on 43, its resistance drops to a low value, and enough current can then flow in the relay coil to pull in the core and operate the contacts 58, 59. Each of the sensors 43 are connected on one side to buss 53, and the relay coils to buss 54. The same battery 55 serves for all relays. When switch 56 is open no relays can operate, even though light falls on the sensors 43.

A source of voltage for relays 51 and 52 and lamps 32 is provided by leads 62 and 63. Lead 62, the high voltage lead, goes to the contacts 64, 68 of the relays 51, 52. These contacts in conjunction with contacts 66, 70, provide current to relay coils 72, 73, to hold the relays in, once current is provided from another source (such as relay 50) to pull the relay in. This is in accordance with well known art. The lower contacts 65, 69, in conjunction with 67, 71, serve to provide voltage from 62 to the lamp 32. The other lead from 32 goes to buss 74 and switch 75. Switch 75 can thus control all lamps together, while the relays 51, 52, control the lamps individually. The relay coils 72, 73, go respectively to busses 76, 77, and to switches 78, 79, respectively. Thus switches 78, 79, can control banks of relays 51, 52, respectively, while relays 50 control them individually. This control comes from relay contacts 58, 60, to relay coil 73 and 59, 61 to relay coil 72.

Assume light falls on 43. When switch 56 is closed relay 50 pulls in and puts voltage on coils 72, 73. When, say, switch 78 is closed, relay 51 pulls in and puts voltage on lamp 32. When switch 75 is closed, lamp 32 will light.

Consider that there are a multiplicity of lamps 47, in FIGURE 2, arranged to illuminate all the detectors 43 when switch 49 is closed. Now, referring to FIGURES 2 and 5, consider the following procedure:

(a) Open switch 78, 79.

(b) Close 56, close 49.

(c) All relays 50 will pull in because their sensors are illuminated by lamps 47.

(d) Close 78.

(e) All relays 51 will pull in and all lamps 32 will light.

(f) Open 56.

(g) All relays 50 will drop out but relays 51 are locked in and lamps 32 stay lighted.

(h) Insert card 20 with pattern A, close 79, 56.

(i) Those positions of pattern A will show light and sensors 43 in pattern A will pull in relays 50, and these pull in corresponding relays 52.

(j) Open 78. Those lamps lighted due to relay 51 alone will go out, those supplied with power by relays 52 will stay on. Thus the pattern A of translucent spots in 20 is converted to luminous spots, impressed as pattern A on sensors 43, and relays 52, and lamps 32. The pattern of light falling on 43 is recorded (in the form of locked-in relays) and also transferred to the matrix of luminous sources.

(k) Open 56.

(l) Replace card 20 with a card with pattern B.

(m) Close 56.

(n) Those spots in pattern B which correspond to pattern A will form pattern (AB) in sensors 43 and relays 50.

(o) Close 78, open 79.

(p) Those lamps 32 corresponding to the pattern (AB) in relays 50 will remain lighted and form pattern (AB) in luminous spots, which is the pattern common to A and B.

(q) Open 56, change card 20 to pattern C, close 56, 79.

(r) The lamps remain on in patern (ABC) corresponding to the light falling on sensors 43 through card pattern C. Pattern (ABC) comprises those spots common to A, B, and C.

This process can be continued indefinitely until as many patterns A, B, C, etc., as desired, are compared. All that is required is simple control of switches 56, 78, and 79, and means to position new cards 20. This can be done by a microfilm strip controlled by means well known in the art. See, for example, those references given in my copending application S.N. 158,000. Or it is possible to use a microfiche containing a two-dimensional array of "cards" 20, with servo means to position any desired one of perhaps 1000 such cards or assemblies 20 into this comparison apparatus. A microfiche apparatus of the kind I have in mind is described in the article: The Mechanized Libray, by L. H. Martin, Datamation, September 1964, pages 32–36.

In this article the author states that it is possible to position any one of the 1000 patterns on the microfiche in a matter of a second or two. Thus, by means of the apparatus which I have described, it is possible to make a selection of a particular card, and make a comparison with another card, in, say, 2 seconds. Thus an information store of say 250,000 items (250,000 points in the matrix) can be searched on a random basis for $n$ descriptors in a time of $2n$ seconds.

While I have described this apparatus in terms of electromechanical relays, it will be clear to the man skilled in the art that the mechanical relays can be replaced with faster electronic relays such as thyratrons, transistors, bistable circuit elements, flip-flops, etc., well known in the art. Also, while the ideal arrangement for rapid placement and substitution of the opaque cards 20 is to use microfilm, either in strip or microfiche form, other record types can be used as well. Also, in place of the lamps 47 to illuminate all of the sensors 43, to set the relays 51 or 52 to light all lamps, an auxiliary set of switches (as is well known in the art) can be used to pull in all the relays 51 or 52 to illuminate the entire matrix of lamps as the first step in the comparison process.

Furthermore, while I have indicated in FIGURE 2 the possibility of making a photographic record (in the plane 45) of the light pattern (third pattern) projecting through the spots in the card 20, there are other ways of making a permanent record of this third pattern. For example, the relays 51 or 52 which, by their pattern of pull-in represent the third pattern, can, by the use of auxiliary contacts transmit this information to recorders of any desired types, etc. Thus while the relays form a temporary storage bank, they can be used to provide signals to permanently record the information they contain, as is well known in the art.

It will be clear also, that the form of the transverse and longitudinal indicia on the information record and the means by which these indicia are used to control the position of the record with relation to the pattern of luminous spots and the detectors and recording means, can be varied in accordance with the many systems that are well known in the art. Because of this and because of the great variety of forms in which the patterns of spots may be presented to the pattern of luminous spots, there is no need to describe this apparatus in greater detail. For example, the matrix 21 on the record 20 can be as large, larger, or smaller, than the matrix of the luminous source and the detectors, although I prefer that the record be much smaller, to facilitate the selection of and successive placement of the different record patterns into the comparator.

Also, because the patterns of spots detected by the sensors 43 is stored temporarily, it can be used to update, or alter the luminous pattern, or it can simply be recorded, and the same (previous) luminous pattern be used with another card. For example, consider cards A, B, C, D. It is desired to compare patterns A and B and to compare the resulting pattern (AB) separately with C and with D. In this case, after pattern (AB) is recorded and the luminous source altered to conform to (AB), this pattern is compared with C and the result (ABC) is recorded. Then without altering the luminous pattern (AB), it is compared with D to give (ABD) which is recorded, and so on. To do this, pattern (AB) is stored in relays 51, for example, and this pattern transferred to the lamps by opening switch 79. Then when card C is in place, the pattern (ABC) is recorded in relays 52, their pattern can be recorded at 45, or (by the use of auxiliary contacts, etc.) recorded elsewhere. Then this relay record is destroyed by opening switch 79. The light pattern 32 is still stored as (AB) in relays 51. Then with record D in place, the pattern on 43 is (ABD). This is temporarily recorded in relays 52 and can be recorded elsewhere, and so on.

These separate records can later be studied as to the choice of and number of units of information (represented by the individual spots in the pattern) corresponding to the various combinations of cards representing the various descriptors. Of course, it is desirable in this process of search, to apply first those cards representative of the most important descriptors, and so on.

It will be clear that different relay systems can be used other than the one shown in FIGURE 5. For example, if each of the relays 51 and 52 have two windings, one corresponding to the coil 57 on relays 50 and one like 72, 73, on the relays 51 and 52, the relays 50 can be dispensed with. On the other hand, by the use of relay 50, as many sets of temporary storage relays like 51 and 52 can be used as desired.

In FIGURES 2 and 5, I have shown a system employing lamps, photoelectric sensors and relays which will compare two spot patterns on the same matrix of possible spot positions, and record the spot positions which are common to both patterns. While this is a completely workable system, and can be quite fast, since all possible spot positions are compared simultaneously (parallel comparison), it is expensive in equipment. For example, there is one lamp, one sensor, and possibly as many as three relays for each spot position in the matrix. The matrices can be scanned and spots compared on a serial rather than a parallel basis. This may be most convenient where there are great numbers of possible spot positions in the matrix. An embodiment of a system employing serial spot comparison is illustrated in FIGURES 6, 7, and 8.

Figures 6, 7, 8:
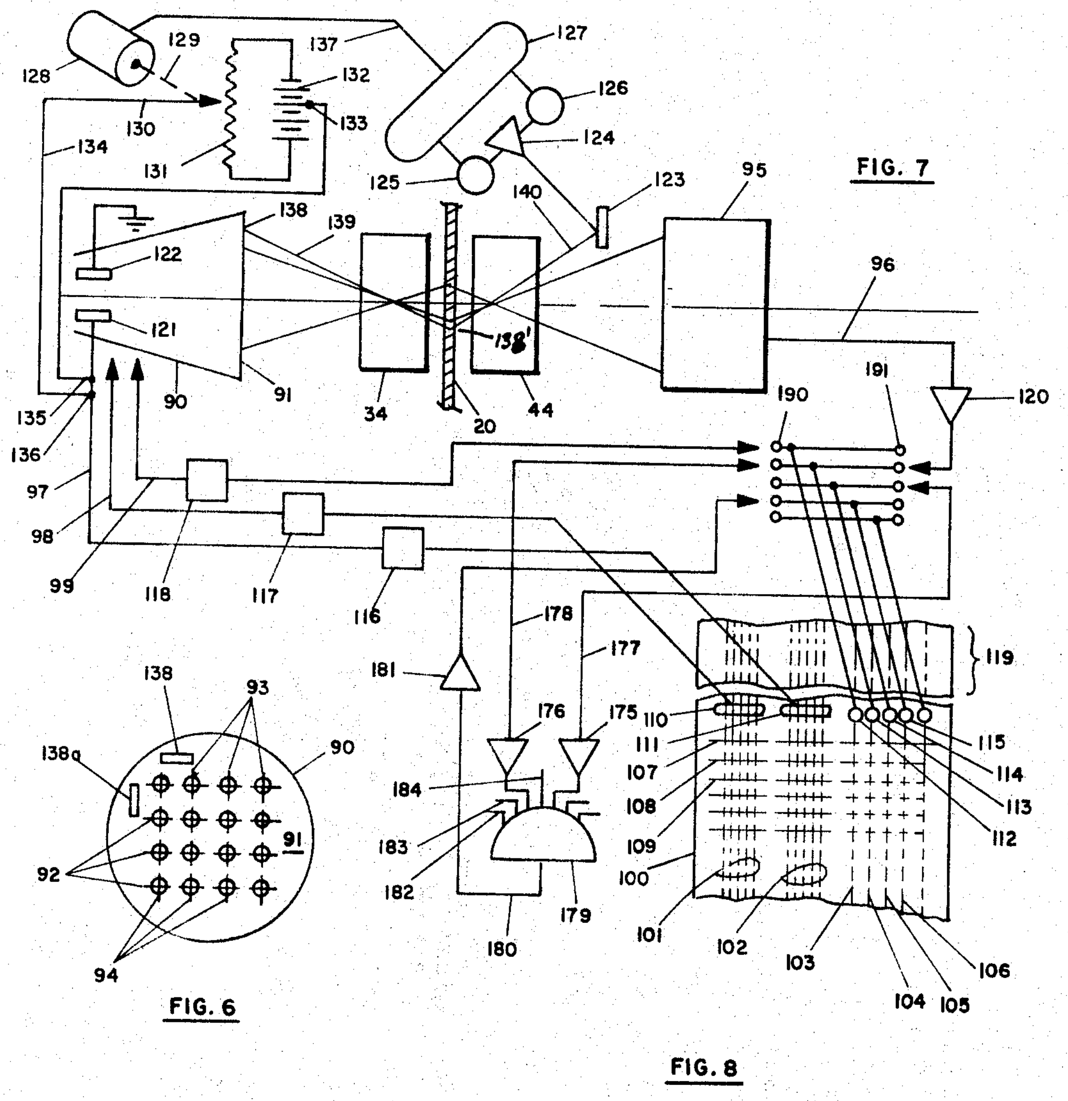
FIGURE 6 is a view of a cathode ray tube used as a luminous source in this search system.
FIGURE 7 represents schematically an electro-optical embodiment of this search system for detecting and recording the spot pattern on a record card, and for controlling the luminous spot pattern in terms of recorded impulses.
FIGURE 8 represents the reproducible recording portion of the system of FIGURE 7.

In FIGURE 6, I show the face 91 of a cathode ray oscilloscope (CRO) 90. Marked out on the face of the CRO are horizontal lines 92 representing a raster of rows, and vertical lines 93 representing a raster of columns, in the matrix. These lines intersect to provide a matrix of possible spot positions 94. Each of these possible spot positions has an address (row and column designation) that gives the position of each spot. Each address corresponds to a pair of voltages, which, if placed on the deflecting plates of the CRO (if it is an electrostatically deflecting system, and the same principle holds for a CRO in which electromagnetic deflection is used) will position the beam to that particular address. Then if the proper voltage is placed on the Z axis grid, the beam current will be increased and a luminous spot will be shown at that address. This art is well known and need not be described in greater detail at this time. Thus, by applying the deflecting voltages in pairs in proper magnitude and sequence, and the corresponding Z axis pulse, the beam spot of light can be made to appear at any of the possible spot positions of the matrix.

In FIGURE 8, I show how these deflecting voltages can be provided. I show, for example, a magnetic tape 100 with a number of tracks of recorded information. There are a group of tracks 101 (which may be of any desired number). The actual number represents, in binary configuration, the number of possible horizontal positions in the matrix, that is, the number of columns. These tracks are read by a group of magnetic heads 110 which provide pulse signals to a digital/analog (D/A) converter 116 which provides an analog voltage of a magnitude corresponding to the digital number recorded in that group of tracks at the particular address position, 107, 108, 109, etc. This voltage goes to the horizontal deflecting plates 121, 122, through lead 97 to position the beam to the proper column.

Similarly, a group of tracks 102 with corresponding reading heads 111 and D/A converter 117 provides a vertical deflecting voltage which through lead 98 positions the beam to the proper row, according to the recorded information in the proper address row 107, 108, 109, etc. Thus, by listing on the tape the X and Y addresses of all the possible spot positions, in sequence, the beam can be made to trace out all of these positions. Corresponding to the X and Y address tracks 102 and 103 is a track 103 that provides a pulse, through its reading head 112 and D/A converter 118 to the Z axis grid of the CRO. This is for the purpose of providing a voltage to brighten the beam while the beam is positioned according to the X and Y addresses. Since in this process of comparison, the first step is to illuminate all possible spot position in the matrix, all address positions on tape 100 will contain a signal recorded on track 103 to provide a brightening of the beam.

Additional tracks 104, 105, etc., are arranged to reproducibly record and to provide brightening pulses similar to track 103, as will be explained below.

Referring now to FIGURE 7, we see in plan view the CRO 90, face 91, optics 38 and card 20 (as in FIG. 5) and sensitive photoelectric detector 95 with output leads 96. As in FIGURE 5, the optics 38 are for the purpose of projecting or imaging this pattern of luminous spots from 91 onto the card face 20, with the matrices in alignment. When the beam reaches an address corresponding to a translucent spot on the card, light will pass through the card and fall on the detector 95. The output signal on head 96 is amplified by amplifier 120 and goes to record/read head 113 of track 104. Thus, while the tape 100 has address 107 under the read heads, and the beam is positioned according to the address in tracks 101 and 102 at row 107, and the Z axis signal from track 103 brightens the beam and if light shines through the card, the signal from 95 is recorded by head 113 onto track 104 at row 107. By shifting the tape to row 108, the same comparison is made at another address in the matrix, and a corresponding pulse is recorded on track 104 if there is a corresponding spot in the card 20. If there is no spot, there will be no light and no pulse, and no record made in track 104. When the complete scan of all possible spot positions 107, 108, 109, etc., is completed, the recorded pulses in trace 104 will represent those addresses in the matrix which correspond to the pattern of translucent spots in card 20. This column is thus a record of the pattern of light spots shown through card 20. The apparatus so far described can be considered as apparatus for reading and recording spot patterns, as well as apparatus for comparing spot patterns. The difference lies in the pattern of the luminous source. If it is the pattern of the full matrix, then the result (third pattern) is the pattern of the card. If the luminous pattern is the pattern of another card, then the result will be a comparison of the patterns on the two cards.

For the case where all possible spot positions in the matrix are illuminated on 91, the record in track 104 is the pattern of card 20. Let us call this card A. Now, if the process is repeated, and the tape again scanned through all addresses 107, 108, 109, etc., and if the Z axis grid of the CRO is controlled by track 104 (not 103) through head 113, then the pattern of light spots on 91 will be pattern A. Now, if we have changed card 20 to a card with pattern B, the light spots that show through the card to detector 95 and which will be recorded on track 105 will be pattern (AB) which is the pattern of spots common to patterns A and B.

We can then repeat the operation, reading pulses from track 105 to control the CRO pattern on 91 to pattern (AB) and by changing card 20 to pattern C, the response of detector 95 recorded on track 106 through head 114 will then be pattern (ABC), the comparison between A and B and C. This process can be carried on indefinitely so long as there are tracks on the tape. If it is desired to compare A and B and D, then the Z axis control is connected to head 104 and card pattern D is used, and so on. The Z axis control can be connected to any previously recorded track 103, 104, 105, etc., and the pulses from 95 are recorded simultaneously on another clear track.

The tracks 104, 105, 106, etc. may be considered as temporary storage of the patterns (AB), (ABC), etc. However, as is well known in the art, the recorded bits on tape 100 can be transferred to another magnetic tape for permanent storage. They also can be played out to the CRO 90 and photographed by replacing the card 20 with a photographic film, as is well known in the art. Or the addresses and pulses recorded in columns 104, 105, 106, etc., can be printed out in a conventional computer printer, for later study. Since each of the addresses corresponds to a document or other unit of information, the printout can be used to locate the desired documents. Also, the recorded information on tracks 104, 105, 106, etc. of tape 100 can be used in a document microfilm storage system like that described in my copending applicating S.N. 158,000 to locate and copy the desired documents.

Tape 100 can be a loop of tape that has as many rows 107, 108, 109, etc. as there are possible spot positions in the matrix. The loop is arranged to make a complete transit around the heads and then stop. The card 20 is then changed, the leads to the heads 112, 113, are switched and the loop makes another transit, and so on. Or the record 100 can be a magnetic digital disc, drum or core storage such as are well known in the computer art. If desired, the permanently recorded tracks 101, 102, 103, can be photoelectrically recorded and read since they do not change with different search problems. Only the data on tracks 104, 105, 106, etc., are preferably of magnetic recording so that they can be erased and the recording medium used over again. Any combination of photographic and magnetic recording of digital information is considered to be included in this invention.

In FIGURE 8, I show in dotted lines, leads 178, 177 from reading heads 113, 114, respectively. These are brought through amplifiers 176, 175, to a coincidence circuit, known in the art as an "AND" gate. This combination of transistors and diodes is used extensively in computer logic circuits, and is fully described in the literature and in textbooks on computer circuits. When pulses are applied simultaneously to input leads 178, 177, a pulse will be formed in the output lead 180, which, amplified by 181 can be recorded by head 115, for example.

This coincidence circuit opens up the possibility of using the apparatus of FIGURES 7 and 8 to read the patterns of spots on the cards and to resproducibly record them on adjacent tracks 104, 105, etc. Then the record 100 can be run through all positions 107, 108, 109, etc. and the coincidence circuit used to compare the pulses on tracks 104, 105 for coincidence. It will then record on track 106, for example, a pulse at those addresses where there are coincident pulses on tracks 104 and 105.

The "AND" circuit can be used to compare as many tracks as desired for coincident pulses. Thus when a group of cards ABCD and E, for example, have been read and their patterns recorded, they can be compared in any desired combination by running the record 100 to all matrix positions, connecting leads 178, 177, 182, 183, 184, etc. of the AND gate in any desired combination, to as many tracks as desired, and recording the output.

Also, it will be clear that a signal recorded, say on track 104, can be compared simultaneously with a pattern on card 20 being read, the two sets of signals compared, and the coincidence recorded simultaneously on another track.

In connection with FIGURES 1 and 2, I pointed out that it would probably be necessary to use a card which is a microfilm or other optically reduced facsimile of the pattern of spots to be recorded. To position the spot matrix on the card accurately with respect to the matrix on the tube face 91 will require the use of transverse and longitudinal guide indicia 23, 24 on the microfilm. Servo means controlled by these indicia and light sources and photoelectric detectors on the card positioning apparatus, will serve to position the card or film to the proper position.

It is possible also to use the spot on the CRO as the light source for the servo when the card 20 is in position. Thus we can produce scan lines on the CRO face 91 corresponding to the guides 23 and 24. And with the use of appropriate photoelectric detectors (as outlined in my patent #2,820,907) and servo means, the card 20 can be positioned precisely with respect to the pattern on 91. Thus I contemplate positioning the cards or film pattern by the use of separate light sources and photoelectric detectors cooperating with servo means. I include the possibility of using the CRO as the source of light and appropriate photoelectric detectors (such as one skilled in the art might provide) in conjunction with the same (or additional) servo means, to position the card pattern accurately with respect to the CRO.

In FIGURE 7 there are two elements which must be positioned accurately relative to each other, namely, the matrix on the face 91 and the matrix on the card 20. The detector 95 is oversize and need not be accurately positioned. Thus it is possible to move the pattern on 91, rather than to move the card, in order to get alignment of the two matrices. Now the pattern on 91 can be moved by changing the voltages on the deflecting plates, that is, the voltage difference between the two plates, one of which is generally grounded. The voltages that come from the D/A converters 116, 117, are accurately adjusted so as to provide proper range in voltage needed to move the beam from one edge to the other of the matrix. Even so, provision can be made in the D/A converter to alter this voltage as needed to provide the proper scale of the matrix.

Furthermore, it is possible to change the position of the matrix on the CRO face by inserting a D.-C. bias voltage in the lead 97, for example, from the D/A converter 116 to the deflecting plate 121. The opposite plate 122 is grounded. Change in this bias voltage changes the average or zero position of the beam, about which it moves, due to the voltages supplied by the D/A converter. Assume that the line 97 is broken at 135, 136 and leads 133 and 134 are attached. Lead 133 goes to the center tap of a D.-C. voltage 132, which voltage is applied to a potentiometer 131. The slider 130 is connected to lead 134. Depending on the position of slider 130, the bias voltage can be any D.-C. voltage, plus or minus, of half the value of 132. This slider is controlled by servo motor 128 through drive 129, from leads 137, from amplifier 127. On the CRO face 91, FIGURE 6, by proper deflecting voltages, the beam can illuminate a bar 138, at a fixed position in the Y direction relative to the matrix. In FIGURE 7, this bar of light 138 is focussed on point 138' on card 20. This is a translucent spot in fixed position relative to the matrix. This provides a luminous spot that is focussed by optics 44 onto mirror 123 and onto silvered prism 124. There the light divides to the photoelectric cells 125, 126, which feed amplifier 127. When the light is balanced on the prism, the signals from the two cells are equal and no output of the servo amplifier 127 is provided. However, if the card 20 is not in correct position, the beam 140 will not fall evenly on the edge of the prism and more light will fall on one cell than the other. A voltage then will be supplied by the servo amplifier to the servo motor 128 to adjust the bias by moving the slider 130 so as to bring the bar 138 on the face 91 to a different position so that the beam 140 will split evenly on the edge of the prism.

This type of photoelectric servo system is very well known in the art (see, for example, #2,820,907) and there are many varieties of servo systems that can be used. The details of the servo system do not form part of this invention. All that is pertinent is the fact that a servo system is provided, which includes points or bars of light on the face of the CRO cooperating with translucent spots on the card or film 20, to operate an optical detector and servo means to adjust the bias in the deflecting voltage to reposition the spots and bars to a true position corresponding to the matrix on the card or film. The servo can be electromechanical, as illustrated. Or it can be entirely electronic in that the amplifier current is used directly to create the bias voltage, which is held constant until the cycle of scanning all of the matrix points is completed. This type of servo is well known in the art and need not be described further. Also, while I have shown a servo system in conjunction with one pair of deflecting plates (in the Y direction) it will be clear that a similar system can be used to position the matrix in the X direction as well.

I have shown in FIGURE 8 a portion 119 of the record 100 which may be used to control the beam position for the positioning process. The addresses on tracks 101 and 102 correspond to the position of the bar 138, while the signal bits in track 103 create the brightening pulses, as explained above. The process can include a preliminary interval of time after the card 20 is in *rough* position, when the addresses 119 are provided to produce the position bar (or bars, 138, **138*a*) (since both X and Y positioning can be carried on simultaneously) which, with the servos, positions the matrix on the scope face. Then the portion 107, 108**, etc. is run, carrying out the scan of all positions, and so on.

What I have shown is that a pattern of luminous spots can be created on the face of a CRO. The controls to the deflecting plates and brightening grid are provided by D/A converters getting digital signals from a magnetic record (such as tape, tape loop, disc, drum, core) or a photoelectric digital record. This pattern of luminous spots is projected onto the card or strip to match the positions of the matrices. Those points which are in common are projected through the card and are detected and serve to record a corresponding bit on the magnetic record. This track can then be used in the next cycle, with a new pattern card, to make a further comparison, and so on. Or, if desired, the CRO can be used to scan all spots in the matrix so as to record the pattern on a first card. Then the same process is repeated on a second card. Then the recorded patterns of the two cards can be compared by the coincidence circuits of FIGURE 8.

The cards can be separate physical cards of paper, metal, or plastic, or photoreduced facsimiles on separate cards, or a multiplicity of facsimiles on a single card, or on a strip or tape. These cards are arranged for rapid search for the desired card pattern, either by choosing separate cards, positioning the microfiche containing an array of card patterns, or by driving a microfilm strip to the proper position. This is shown in my copending application S.N. 158,000. The accurate positioning of the pattern can be done by servos acting on the card, or strip, to move it, or to move appropriate optical elements in the path (see #2,820,907) or the servo can operate on the deflecting voltages to reposition the pattern on the face of the CRO to correspond to the actual position of the card.

Every time that a new card is put into position, and a complete scan of the beam is made to all possible spot position, those positions which create signals in the detector are recorded magnetically. This record can be transferred to more permanent form in magnetic or photographic digital form, analog position, or alphanumeric print out.

What is required in the most general practice of this invention is:

(1) A source of illumination comprising a multiplicity of spot sources, arranged in the desired matrix, or (2) A single source of illumination capable of being moved sequentially to each possible spot position of the matrix, (3) Means to selectively illuminate an individual one of the multiplicity of sources of light of (1), or (4) Control the illumination of the single source at any selected one of the many possible spot positions in the matrix, (5) Means to determine the exact position of the illuminated spots, (6) Means for placing, projecting or imaging, with or without dimensional change, the luminous pattern of (1), (2), (3), or (4) onto the pattern of spots (translucent, reflecting, or other character) on the front side of a record sheet or card, (7) Means to relatively position the card with respect to the luminous source so that the matrices are in alignment, (8) Means to detect the points in the card at which the luminous spot is superimposed on a record spot. For example, light will pass through the card to the back side of the card and there be detected if the spots are translucent, or will be reflected from the front surface and be detected if the spots are reflecting, etc.

(9) Means to record the position of the coincident spot in association with a signal representative of the instantaneous position of the coincident spot,

(10) Means to control the luminosity of the source in accordance with a recorded pattern of spots.

I have shown in FIGURES 2 and 5 an embodiment corresponding to (1) above. In FIGURE 7, I have shown an embodiment of the form of (2) above. It will be clear that (1) without (3) and (2) without (4), and both (1) and (3) without (5) will not do the job. In other words, while it is possible by the use of moving masks or pairs or rotating masks or mirrors, to create a moving spot in a two-dimensional pattern, as required in (2) this in itself is of little value. What is required is an electro-mechanico-optical system, as described, plus a digital encoder or synchronized recording of position, or similar device to control the spot or to tell precisely where the spot is at any instant, and a signal reproducible storage means that can be scanned in the same manner that the matrix of possible spot positions is scanned by the spot.

What I desire in this system is:

(a) A source of light capable of being pulsed in intensity, (b) Electro-mechanico-optical means to move the light source in the pattern of the matrix, (c) Means to determine the precise position or address of the source at any instant, (d) Means to detect the position of the coincident points in the two patterns, and (e) Means to record the position of coincident points.

While it may not be necessary to pulse the light source since the position of the spot on the card will be determined by the coincident record of position (c) and (d), it is probably desirable to have a light source that is pulsed in accordance with the recorded signals.

Figure 9:
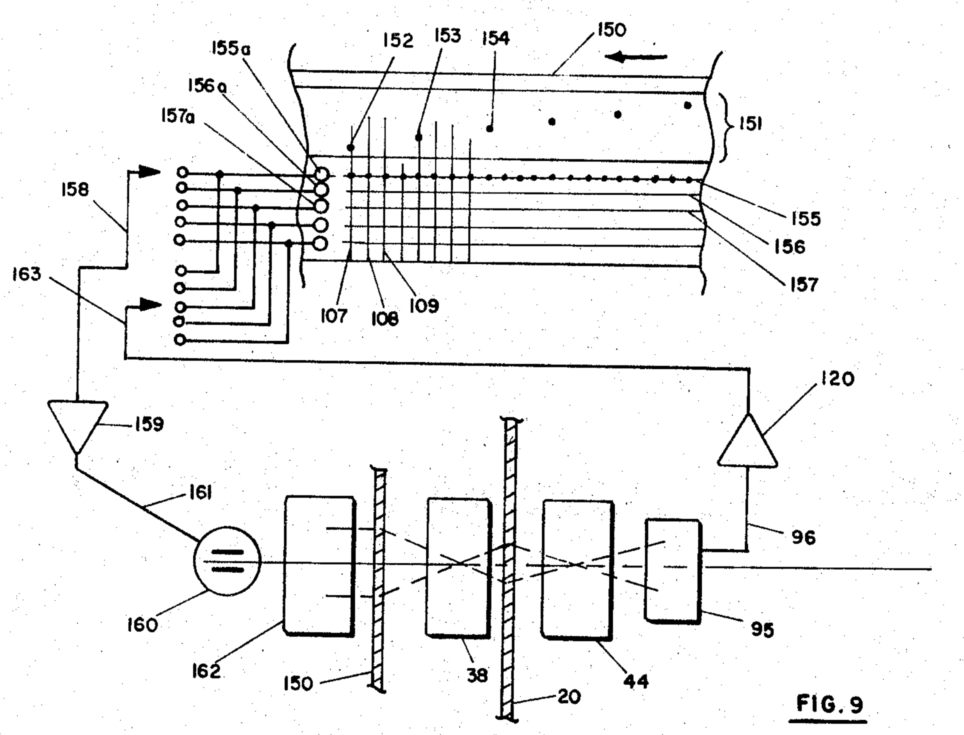
FIGURE 9 is an embodiment of this system in which the spot pattern is controlled mechanically by means of a moving translucent mask.

One embodiment of this electro-mechanico-optical system is illustrated in FIGURE 9. Here I show in plane view a composite record strip 150 comprising a transverse zone 151 on which is recorded a multiplicity of translucent spots (or perforations) 152, 153, 154, etc. These are arranged in proper longitudinal and transverse spacing such that as the strip is traversed in the direction of the arrow past a light source, each of the translucent spots sweeps out an adjacent line or column of spots, so that a complete traverse of the strip will have swept out a complete two-dimensional matrix of possible spot positions. On the strip are separate parallel tracks for magnetic recording of pulsed signals. One of these, 155, is a track, that provides pulses for each of the possible positions in the matrix. The other tracks 156, 157, etc., are for the purpose of recording response of the photoelectric detector 95, detecting the passage of light pulses through the card, or in general, coincidence of spots.

The stirp 150 is shown in cross section between optics 162 and 38. Pulsed light source 160 with pulsing lead 161 illuminates the optics 162. The spots 152, 153, etc., are sequentially illuminated and imaged on the card 20. When the image of spots 152, 153, as illuminated by momentary pulse of light from 160, fall on a translucent spot on 20, light passed by optics 44 to detectors 95 will produce a signal, amplified by 120 which is recorded on one of the tracks 156, 157, etc.

As was described in connection with FIGURE 5, the signals on track 155 read by head **155*a* and amplified by 159 will pulse light 160 in accordance with each matrix position. The corresponding recorded signals on track 156 represent the pattern of spot positions in the card 20. If the lamp 160 is connected by switch 158 to track 156 and a second card 20 is inserted into the system, the signals detected by 95 and recorded on track 157** will be the pattern of spots common to the two cards, and so on.

The strip 150 can be a disc or a drum. It can also be constructed of two strips, discs or drums, one of which comprises the optical tracks 151 and the other the magnetic storage tracks 155, 156, 157, etc. Of course, track 155 can also be optical. It will be necessary to have precise synchronism between the two strips, discs or drums. Also, the optical tracks 151 and track 155 (which can be optical or magnetic) can be on one strip, disc or drum, while the storage tracks 156, 157, etc., can be conventional core, disc or drum digital memory storage combined with logic circuits as in a conventional computer.

In FIGURE 7, the optical spot is slave to the recorded position control and pulse control signals. In FIGURE 9, the optical system is the master, and the pulse signals are slave to the optical system. However, either system is capable of carrying out the objects of this invention.

In FIGURE 9, the tracks 151 comprise the mechanico-optical part of the system, and the track 155 is the encoder, which is used to indicate the true position of the spot (by the position along the strip 150). Or, it might be said that position along the strip is the address of the spot position in the matrix, and by simultaneously pulsing the light at a given spot and detecting its presence on the back of the card, and recording it on the strip at the same address (or position along the strip) we are *detecting* the position of the translucent spot and *recording* the position of the translucent spot.

There are other ways in which a moving spot of light can be generated. One is by the use of optico-electrical crystals, which with the application of suitable voltages will deflect a beam of light parallel to itself. Thus, by the use of an appropriate set of crystals and suitable voltage and switching, a beam of light can be moved by desired increments in each of the two orthogonal coordinate directions. One such system is described in "Digital Light Deflection" by T. J. Nelson, Bell System Technical Journal, volume 43, #3, May 1964. This optical device with the recorded signals similar to those of 100, FIGURE 8, could be used to control the spot position.

Another way to create the moving spot is to use a mirror system, such as illustrated in #2,820,907, with a second system set in a plane at right angles, both controlled by appropriate servos. These could be controlled by the signals of strip 100. However, it is possible also to move the mirrors in a precise cyclical pattern by motor means, so as to sweep out the desired matrix of possible spot positions. This will require that digital encoders be placed on the shafts of the rotating mirrors so that the actual mirror positions can be determined and recorded. These encoder indications will be recorded on a magnetic strip, disc or drum, and the response of detector 95 will be simultaneously recorded as well.

Figure 10:
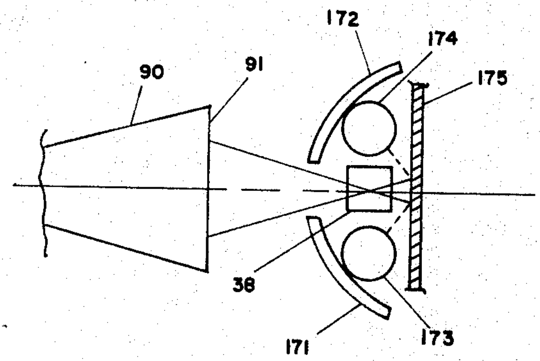
FIGURE 10 represents an embodiment adapted to the use of reflecting spots on said record medium.

In FIGURES 7 and 8, I show how a moving spot generated by a CRO (or other source) can be imaged onto a pattern of translucent spots in a card 20, and those spots which coincide in the two patterns will pass light through the card to a photoelectric detector 95. In FIGURE 10, I show schematically a similar system in which a pattern of *reflecting* spots is provided on an opaque card 175. The photoelectric detectors 173, 174, in reflecting shields 171, 172, are placed so as to receive the reflected and scattered light from the illuminated reflecting spots on the card. Thus, this invention is applicable to the comparison of spot patterns on opaque cards, strips, or films carrying translucent spots, perforations, or reflecting spots, or spots of other character.

In my copending application S.N. 158,000, now U.S. Patent No. 3,179,001, I show how it is possible to create a series of microfilm strips, to be displayed in a multiplicity of strip handling means, so as to rapidly position any desired frame of the strip in front of a scanner adapted to read the information on the strip.

In light of the objects of this invention, such a microfilm strip might be composed of a strip of photographic film on which are recorded a multiplicity of frames of information, each frame comprising a pattern of spots (translucent, preferably on an opaque background) of possibly 10,000 to 100,000 or even 500,000 or more possible spot positions in the matrix, and a digital index identifying the particular pattern. Thus it is unnecessary to scan and read each spot in each frame, since we can locate the proper frame by reading the index pattern, which is much smaller and simpler to read.

Having located the proper frame by searching the index patterns, it is possible then to scan the pattern of spots in the matrix by the simultaneous process of FIGURE 2 or the sequential processes of FIGURES 7 and 9. In all three of these embodiments, the actual comparison of the two patterns is accomplished by mechanico-optical processes, that is, the image of the luminous spot and the translucent spot are either superimposed or they are not. Those that are superimposed record as being similar, those that are not, do not record.

Another way to make this comparison is to scan a first pattern of translucent spots and record the position of all the spots and store this on a magnetic track, as in FIGURE 8. Then a second pattern is scanned, and the positions of spots in that pattern recorded on the same strip. Then by means of logical circuits, such as coincidence circuits, shown in FIGURE 8, the two sets of digital signals are compared and those spots which have the same addresses are recorded in a separate track on strip 100.

This is illustrated in FIGURE 8. Consider that strip 100 is a tape loop, disc, drum, or core, having memory positions for each address 107, 108, etc., in the matrix. A spot of light is placed at each point in the matrix. This can be done by recording pulse creating signals on track 103 at all addresses 107, 108, 109, etc. Then when card A is put into position detector 95 will read the coincident points which will be the pattern of A, and record the positions in track 104. Next, card B is put into position, the spot is again placed in all possible spot positions and the detector 95 recorded in track 105. Now by comparing tracks 104 and 105 to look for coincidence of pulses the comparison is made. If desired, the result of this comparison of tracks 104, 105 can be recorded in 106, and tracks 104, 105 erased. Then with card C, the pattern C can be recorded in track 104 and this pattern compared with the pattern in track 106, and so on. Of course, these comparisons can be made simultaneously with the scanning of the matrix, so that by the time that the moving spot has completed its scan, all of the comparisons are made and recorded.

This operation is different from that previously described with reference to FIGURES 7 and 8 because in the previous description the recorded track 104 (Pattern A) was used to control the spot of light, which was then optically compared with the card pattern B, to provide a pattern comparison of the two. In this procedure, the first step of positioning the light to all points in the matrix serves to read all spot positions in the patterns, which are recorded, and later compared, one with the other. It will be clear that after the first matrix pattern is read and recorded, the second pattern, while it is being read, can be compared simultaneously with the recorded pattern. It will be clear also, that by this method of reading the pattern and making electronic comparisons it is possible to position two film strips, each with a different frame or card in scanning position and by using two scanners driven by the same address signals, to compare the spot patterns directly. At the expense of more equipment, as many as *n* cards can be compared simultaneously by using *n* scanners driven by the same matrix control, with appropriate circuits to make the comparisons.

Although a number of embodiments of the present invention have been illustrated and described, it will be obvious to those skilled in the art that many modifications, variations, and equivalents of this invention may be made without departing from the spirit and the scope thereof, and therefore, only such limitations should be imposed as are indicated in the appended claims.

I claim:

1. The method of comparing spot patterns comprising
(1) creating a first pattern of spots on a record medium, said spots arranged in accordance with a predesigned matrix of possible spot positions,
(2) creating a second pattern of luminous spots arranged in accordance with the same matrix of possible spot positions,
(3) forming a facsimile of reduced size of said pattern of luminous spots superimposed on said pattern of spots on said record so that their matrices coincide, and
(4) detecting the third pattern of spots comprising those luminous spots of said second pattern which coincide with the spots of said first pattern on said record.

2. The method of claim 1 with the additional step of reproducibly recording the said third pattern of spots.

3. The method of claim 2 with the additional step of controlling the creation of the said pattern of luminous spots in accordance with said recorded third pattern of spots.

4. The method of claim 3 with the additional steps of creating a fourth pattern of spots on a second record, projecting said third pattern of luminous spots onto said fourth pattern and recording the fifth pattern of luminous spots comprising those spots of said third pattern which coincide with spots of said fourth pattern of spots on said second record.

5. The method of comparing the patterns of translucent spots on a first and a second record card, said spots on each card arranged in the same predesigned matrix of possible spot positions, comprising,
(1) creating a full pattern of luminous spots which includes at least all spots in said matrix,
(2) imaging said full pattern of luminous spots onto said first record card,
(3) positioning relatively said image and said first card so that their matrices are aligned,
(4) detecting the first pattern of luminous spots comprising those spots which coincide with the spots on said first record card,
(5) generating a first pattern of luminous spots in accordance with said detected first pattern,
(6) replacing said first record card by said second record card,
(7) creating an optical image of said first pattern of luminous spots on the front face of said second card,
(8) positioning relatively said image and said card so that the matrices of their respective patterns are aligned, and
(9) detecting the third pattern of luminous spots which project through said translucent spots to the back face of said second card.

6. The method of comparing spot patterns comprising,
(1) generating a moving spot of radiant energy,
(2) controlling the path of said spot of radiant energy to trace out a predesigned matrix of possible spot positions,
(3) determining the position of the spot at each instant of time,
(4) controlling the intensity of the spot so as to be of high intensity at selected positions in said matrix,
(5) projecting the moving spot onto a record containing a pattern of spots arranged in the form of said matrix, and
(6) detecting, the positions in the matrix of those spots on said record which coincide with the positions of said moving spot of radiant energy.

7. The method of comparing spot positions comprising,
(1) preparing a reproducible recording of possible spot positions in a predesigned matrix of possible spot positions,
(2) moving a spot of light in accordance with said recording of spot positions,
(3) controlling the intensity of luminosity of said spot in accordance with a predetermined pattern of spots,
(4) projecting the luminous pattern of said moving spot onto a record card comprising a pattern of spots of distinctive character,
(5) detecting the coincidence of said projected spot with spots in said card pattern, and
(6) reproducibly recording said coincidence as a function of the position of said spots.

8. The method of comparing spot positions comprising,
(1) mechanico-optically moving a spot of light in accordance with a predesigned matrix of possible spot positions,
(2) controlling the luminosity of the spot at each position in accordance with a prearranged pattern of spots,
(3) determining the position of said spot at each position,
(4) projecting the pattern of positions of said spot onto a record on which is recorded a pattern of spots of distinctive character, (5) detecting the coincidence of said projected spots with the spots on said card pattern, and (6) recording said coincidence as a function of the position of said luminous spot.

9. The method of reproducibly recording the pattern of spots arranged in a predesigned matrix of possible spot positions and recorded in distinctive character on a record card, comprising, (1) creating a basic pattern of spots of radiant energy in accordance with all possible spot positions in said matrix, (2) projecting said basic pattern of radiant spots onto said record, (3) relatively positioning said card and said basic pattern so that their matrices coincide, (4) detecting the coincidence of radiant spots with those spots on said record, and (5) reproducibly recording said coincidence as a function of the position in the matrix at which said coincidence occurs.

10. The method as in claim 9 with the additional steps of, (1) repeating the steps 1–5 with a second pattern on a second card, (2) reproducing sequentially for each possible position in the matrix the records of the presence of spots in said first pattern and spots in said second pattern and determining the coincidence of spots from both patterns at points in the matrix, and (3) recording as a function of the matrix position, the presence of coincident spots in said two patterns.

11. Apparatus for comparing spot patterns in the form of a multiplicity of spots of unique character on a record card, said spots arranged in accordance with a predesigned matrix of possible spot positions, comprising, (1) luminous means for generating a first pattern of luminous spots arranged on said matrix, (2) record means carrying a second pattern of spots arranged in said matrix, (3) positioning means to relatively position said record with respect to said luminous means, (4) means for imaging said luminous spot pattern onto said record pattern, so that their matrices coincide, and, (5) detecting means for detecting the third pattern comprising those luminous spots which coincide with spots on said record.

12. Apparatus as in claim 11 including means for reproducibly recording said third pattern of spots.

13. Apparatus as in claim 12 including control means responsive to said recording means to control said generating means to provide said luminous spots in said third pattern.

14. Apparatus as in claim 11 in which said record spots are reflecting spots on said record surface.

15. Apparatus as in claim 11 in which said generating means comprises a single light source with electro-optico-mechanical light control means.

16. Apparatus as in claim 15 in which said light control means includes translucent mask means.

17. Apparatus as in claim 16 including digital position indicating means associated with said mask means.

18. Apparatus as in claim 11 in which said record comprises a photographic film carrying translucent spots on an opaque background, said spots being in the form of said pattern.

19. Apparatus for reading and recording the addresses of spots in a pattern of spots of distinctive character on a record card, said spots formed in a predetermined matrix of possible spot positions, comprising, (1) means for creating a moving light spot, (2) means for moving said spot to all positions in said matrix of possible spot positions, (3) means for determining at any instant where said spot is positioned, (4) means for projecting an image of said spot onto said pattern so that the two matrices are in alignment, (5) means for detecting when said luminous spot is superimposed on one of the spots of said pattern of spots, and (6) recording the position of said spots when said spots are superimposed.

20. Apparatus for reading and recording the addresses of spots in a pattern of spots of distinctive character on a record card, said spots formed in a predesigned matrix of possible spot positions, comprising, (1) a luminous source including a spot of light, (2) means to move said spot successively to all positions in said matrix of possible spot positions in response to a sequence of electrical control signals, (3) means for projecting an image of said spot onto said card, (4) means to relatively position said source and said record so that their matrices are in alignment, (5) means for detecting when said image of said light spot is superimposed on one of the spots of said pattern, and (6) means to record the position of said superimposed spots.

21. Apparatus for comparing patterns of translucent spots in an opaque record, said spots arranged in a predetermined matrix of possible spot positions, including, (1) a luminous source comprising means to create a pattern of luminous spots arranged in the form of said matrix in accordance with electrical signals corresponding to a desired pattern, (2) an opaque record carrying a pattern of translucent spots arranged in the form of said matrix, (3) means to project said pattern of luminous spots onto a first surface of said record so that the matrices are in alignment, and (4) means to detect the pattern of luminous spots appearing on the second surface of said record.

22. Apparatus as in claim 21 including means responsive to said detecting means to provide electrical signals to create a pattern of luminous spots in said luminous source corresponding to said pattern of luminous spots on said second surface.

23. An information searching system comprising, (1) at least one digital microfilm strip having information in the form of at least two matrices of spots, (2) an index system identifying said matrices, (3) strip handling means for driving said strips, means to locate said index and means to position said matrix in front of a reading gate, and, (4) means for scanning a matrix of spots and reproducibly recording the results of said scan.

24. Apparatus as in claim 23 including means for comparing the results of at least two scannings and means for displaying the results of said comparison.

25. Apparatus as in claim 24 with at least two strips, one in each of two strip handling means, said comparison means capable of comparing the results of two sets of scannings being made simultaneously.

26. Apparatus as in claim 25 in which said comparison is made electronically.

27. Apparatus for reading the spot positions in a pattern of spots of unique character on a record medium, said spots arranged in a matrix of possible spot positions, comprising, (1) a source of illumination comprising a multiplicity of luminous sources arranged in a pattern in the form of said matrix, (2) means to project said pattern of luminous sources onto said record, (3) means to relatively position said record and said source so that their matrices coincide, (4) photoelectric means to detect those positions in the matrix filled with spots from both patterns.

28. Apparatus for reading the spot positions in a pattern of spots on a record medium, said spots of a character different from said record and arranged in a matrix of possible spot positions, comprising, (1) a source of illumination comprising a cathode ray tube,
(2) a reproducible recording of the coordinate signals representative of all possible spot positions in said matrix,
(3) a reproducible recording of light pulsing signals in association with said coordinate signals,
(4) means to control the cathode ray tube to position the beam spot in response to said coordinate and light pulsing signals,
(5) means to image the light pattern from the face of said cathode ray tube onto said record, and
(6) means to detect those positions in said matrix for which the luminous pattern and said record pattern coincide.

29. Apparatus for detecting the spot positions in a pattern of spots on a record medium, said spots arranged in a matrix of possible spot positions, comprising, (1) signal reproducing means including a reproducible recording of the coordinate signals representing all possible spot positions in said matrix,
(2) means to position a spot of light so as to present the spot sequentially at points in a predetermined pattern based on said matrix of possible spot positions,
(3) means associating said reproducing means and said positioning means such that for each position of said spot of light there will be a corresponding coordinate signal,
(4) means to project the pattern of said light spot onto said record and,
(5) means to detect coincidence between said light spot and said pattern on said record.

30. Apparatus as in claim 29 with reproducible recording means associated with said reproducing means to record said coincidence as a function of the position of said spots of light.

31. Apparatus as in claim 11 in which said luminous means generates at least part of said luminous spots in said first pattern simultaneously.

32. Apparatus as in claim 11 in which said luminous means generates said luminous spots in said first pattern of spots sequentially.

33. Apparatus as in claim 32 in which said luminous means comprises a cathode ray tube.

34. Apparatus as in claim 11 in which said first pattern of luminous spots includes all spots in said matrix.

35. Apparatus as in claim 11 in which said means for detecting said third pattern of spots comprises photoelectric means.

36. Apparatus as in claim 12 in which said means for reproducibly recording said third pattern of spots comprises magnetic recording means.

37. Apparatus as in claim 12 in which said means for reproducibly recording said third pattern of spots comprises photographic means.

38. Apparatus as in claim 11 in which said means to relatively position said record with respect to said luminous means comprises photoelectric servo means.

39. Apparatus as in claim 33 in which said means to relatively position said record with respect to said luminous means comprises photoelectric servo means adapted to vary the spot deflecting signals so as to reposition said pattern.

40. Apparatus as in claim 39 in which said servo means is responsive to guide indicia printed on said record means in precise geometric relation to said pattern of spots.

41. Apparatus as in claim 11 in which said imaging means includes optical reduction.

42. Apparatus as in claim 33 including means to control the brightness of said luminous spot at times when said spot is in a matrix spot position corresponding to one of the spots in said first pattern.

43. An information system comprising, (1) information record means comprising,
  (a) a record medium with at least one frame,
  (b) said at least one frame including a pattern of spots arranged in a two-dimensional first matrix of possible spot positions,
  (c) guide indicia on said frame geometrically related in position to said first matrix,
(2) spot radiant energy means,
(3) means for projecting a pattern of spot radiant energy images arranged in a second matrix onto said frame,
(4) means for projecting an image of said radiant energy means onto said indicia,
(5) detection means for detecting the presence of said radiant energy image on said indicia, and
(6) positioning means responsive to said detection means to relatively position said first matrix and said second matrix.

44. Apparatus as in claim 43 in which said record medium comprises a multiplicity of frames.

45. Apparatus as in claim 43 in which said frame is identified by an index spot pattern.

46. Apparatus as in claim 43 in which said positioning means comprises means to move said frame with its first matrix with respect to said radiant energy means.

47. Apparatus as in claim 43 in which said positioning means comprises means to move said radiant energy image second matrix with respect to said frame and said first matrix.

48. Apparatus as in claim 47 in which said spot radiant energy means comprises a cathode ray oscilloscope and said means to move said radiant energy image second matrix comprises bias deflection voltage means.

49. Apparatus as in claim 43 including means to determine when an image spot in said second matrix coincides with a spot in said first matrix.

References Cited

UNITED STATES PATENTS 2,580,270 12/1951 Badgley et al. -------- 88—24

NORTON ANSHER, *Primary Examiner.*

R. A. WINTERCORN, *Assistant Examiner.*